Jan. 5, 1937.   C. J. RODMAN   2,066,647
ENAMELED JOINT AND METHOD OF MANUFACTURE

Filed March 2, 1935

INVENTOR
Clarence J. Rodman
by his attorneys
Byrnes, Stebbins & Blenko

Patented Jan. 5, 1937

2,066,647

UNITED STATES PATENT OFFICE 2,066,647

ENAMELED JOINT AND METHOD OF MANUFACTURE

Clarence J. Rodman, Alliance, Ohio, assignor to The Steel Sanitary Company, Alliance, Ohio, a corporation of Ohio Application March 2, 1935, Serial No. 9,048

3 Claims. (Cl. 219—10)

My invention relates to a welded joint particularly adapted for vitreous enameling, and a method of making such joint.

Many articles of manufacture are now constructed by assembling stamped sheet metal sections and welding them together. It is desirable to enamel certain of these articles, such as refrigerator cabinets, tubs, lavatories, etc. While a considerable amount of effort has been brought to bear upon the problem of providing a welded joint which can satisfactorily be enameled, no solution of this problem has heretofore been presented, to my knowledge, and manufacturers are resorting to various expedients in order to avoid the necessity of enameling welded joints, in spite of the great desirability of so doing.

I have invented a method of making a welded joint which can satisfactorily be enameled. I thus overcome the objections which have heretofore prevented the use of welding in manufacturing articles requiring a continuous, unitary and durable surface layer of enamel.

In accordance with my invention, I connect the members between which the welded joint is to be formed to a suitable source of welding current. The pieces are brought in contact while welding current flows across the joint to heat the edges of the pieces to welding temperature. In order to obtain a welded joint which is susceptible of satisfactory enameling, I find it is necessary to continue the heating of the edges of the pieces to be joined until substantially all the impurities in the metal have been burned out and ejected or expelled from the heated edges. When this object has been accomplished and the edges of the pieces rendered substantially molten, they are pressed together to effect a sound weld.

The heating current is then terminated and the joint is subjected to further working, such as forging, to render the joint of greater density than the parent metal adjacent thereto. The burr formed by upsetting the molten edges is then ground off and it is found that the resulting joint may be enameled successfully by the ordinary processes without chipping or fracturing of the enamel at the joint, which have characterized all previous attempts with which I am familiar, to enamel over a welded joint.

The procedure of the method of my invention and the resulting product are illustrated in the accompanying drawing to which reference is made for a complete understanding of the invention. In the drawing.

Figure 1:
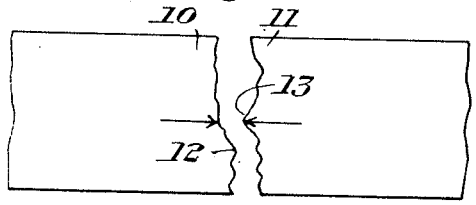
Figure 1 is a partial sectional view through two pieces of sheet metal having their edges disposed in alignment for abutting engagement and welding.

Referring in detail to the drawing, and particularly to Figure 1, the edges of the pieces of sheet metal to be welded together are illustrated at 10 and 11 to an enlarged scale. While these edges have usually been sheared so that they appear to be square and true, there will inevitably be irregularities in the sheared surface even if only microscopic in magnitude. The metal pieces 10 and 11 are connected to any suitable source of welding current and are preferably held in jigs or the like, so that they can be caused to approach and exert pressure on each other as desired.

When the pieces 10 and 11 are moved into engagement, the high points thereof, such as 12 and 13, engage first, with the result that a heating current circulates through the work and fuses the contacting high points and strikes an arc between them. After the initial contact, movement of the pieces toward each other is stopped to permit the arc to effect the desired heating and purifying of the edges before they are actually welded.

Figure 2:
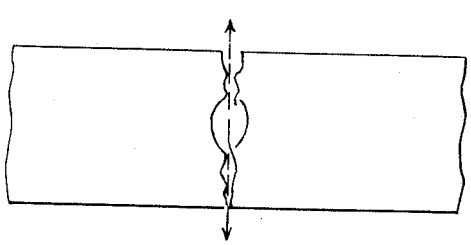

The initiation of the arc is shown in Figure 2. In a short time, the initial arc expands throughout the full thickness of the material and eventually fuses the entire section for a short distance back from the initial edge line, as seen in Figure 3.

The time and character of the heating stage of the process are so controlled as to produce a high temperature gradient between the edge of either piece and the portions thereof immediately adjacent thereto. I preferably effect a quick heating of the edges by supplying thereto heating currents of relatively large magnitude so that substantially the edges only of the pieces are heated, and they to a relatively high temperature approaching the fusion point.

Figure 3:
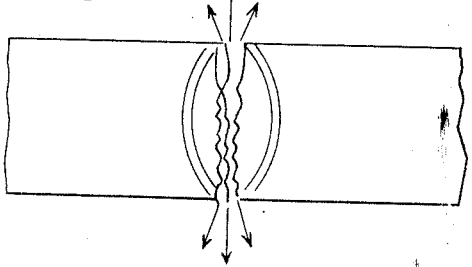

As the arc between the edges of the pieces expands throughout the full section and the edges themselves become substantially molten, as shown in Figure 3, oxides and other impurities, whether formed by the heating or existent in the parent metal, are thrown off in the form of sparks, as shown in Figure 3. I continue this purifying by arc or flash heating for a length of time sufficient to remove substantially all impurities, oxides and other foreign elements from those portions of the edges which are highly heated. The length of time necessary to attain this result can be readily determined by experiment but it will suffice to say that a longer period of arc or flash heating is necessary to obtain this result than has heretofore been thought necessary for ordinary butt welding. It will be noted that all during this time the edges to be welded have not been further advanced toward each other.

Figure 4:
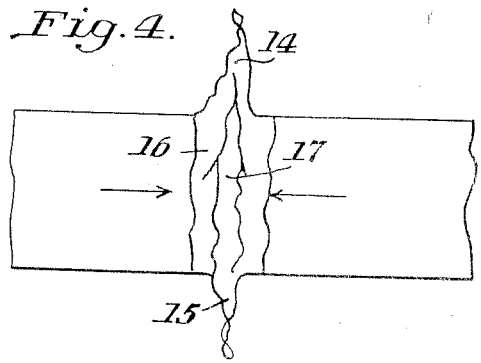

At this stage of the operation, the metal at the edges of the pieces is substantially molten and in a very high state of purity. The next step in the operation is to cause the purified molten edges of the pieces to engage each other, and to upset sufficient of the molten metal to effect a sound weld and to expel therefrom any remaining vestige of oxides or other impurities. This stage of the operation is illustrated in Figure 4. As there shown, the molten material at the edges of the pieces 10 and 11 is forced outwardly of the surfaces thereof in the form of burrs or beads of flash 14 and 15. It will be apparent that any remaining impurities, particularly in the portions of the pieces adjacent the edges of the lateral surfaces, are pressed into the burrs or fins for subsequent removal. The highly heated zone where the weld actually takes place, indicated generally at 16, is thus composed of metal of greater purity than the parent stock because of the purifying action of the long continued arc or flash heating.

Figure 5:
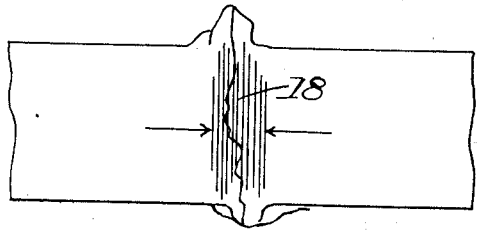
Figures 2 through 7 are similar views illustrating successive stages in the operation which will be described in detail hereafter.

During the first part of the pressure applying stage, the central portion 17 of the weld remains substantially liquid, but on terminating the welding current at about this stage of the process, the molten metal zone solidifies because of loss of heat due to radiation and further upsetting leads to the condition shown generally in Figure 5 where the previously separate edges of the pieces 10 and 11 have coalesced and united into an integral and continuous mass.

Figure 6:
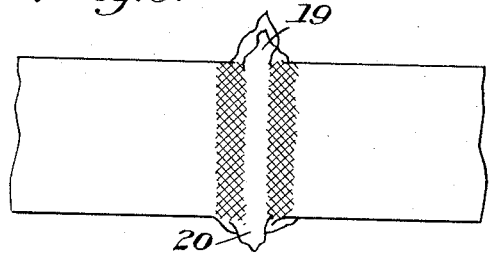

As stated, at about the time the heated edges are finally forced together, I terminate the flow of heating current through the work. No further heat is thus supplied to the weld and it immediately begins to cool. After a slight cooling of the highly heated welding, I subject the joint to a further upsetting which is actually in the nature of a forging operation, as shown in Figure 6. This densifies and compacts the metal at the weld while it is still hot. This operation causes the weld itself to have not only a greater purity than the parent metal but also a greater density. The initially formed flash fin or burr generally drops off, at least in part, but additional metal is upset toward the end of the pressure stage of the process and also during the forging step, as shown in Figures 5 and 6. This flash, instead of being formed of oxides and impurities as in the case of that shown at 14 and 15 in Figure 4, however, is composed of pure dense metal, substantially the same as that of the weld itself indicated at 18.

After the completion of the forging operation, the burrs 19 and 20 formed thereby are removed, preferably by grinding, although any other method of removing may be employed. The appearance of the finished joint with the fins 19 and 20 removed is shown generally in Figure 7, although it is difficult to perceive any external difference between the welded joint and the parent metal on either side thereof. The chemical and physical character of the metal at the joint, however, as previously stated, is different from that of the original stock, being of a greater chemical purity and density.

Figure 7:
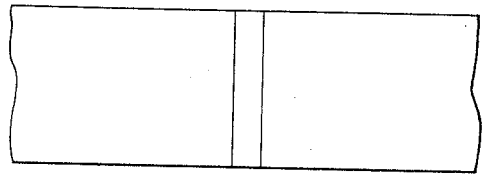
Figure 8:
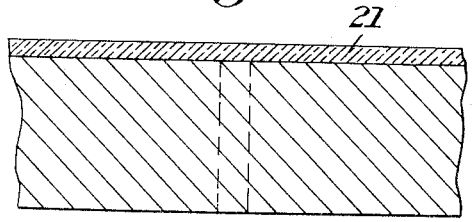
Figure 8 is a sectional view through a welded joint with an enamel coat applied thereto.

The finished joint shown in Figure 7 can readily be enameled by ordinary processes now well known. Figure 8 illustrates an enamel layer applied over the joint. The usual enameling process, of course, includes the firing of a layer of bisque applied to the surface to be enameled. In Figure 8, the enamel coat is shown at 21 and, when applied by approved methods, is found to be tightly adherent to the joint and of such smoothness and uniformity with the remainder of the enameled surface that it is impossible to detect the joint by looking at the enameled surface of the finished article. This is in marked contradistinction to the previous efforts at enameling over welded joints with which I am familiar. In the latter, the impurities remaining in the weld cause the enamel disposed thereover to become rough and warped on firing so that it has very little adherence and is subject to chipping and breakage from relatively slight shocks.

The advantages of my invention will be obvious to those skilled in the art. In the first place, the invention makes possible the manufacture of enameled articles from sectional stampings welded together, whereas such articles have heretofore necessarily been made in one piece. The cost of manufacture of such articles can materially be reduced by forming them of sheet metal sections. The two examples which come to mind most readily are refrigerator cabinets and bath tubs. These two examples both require an absolutely smooth surface when enameled, yet both are difficult to form in one piece. The manufacture of a commercially salable article is thus greatly facilitated by my invention.

Although I have described and illustrated but one preferred practice of my invention, it will be appreciated that numerous changes in the procedure herein disclosed may be made without departing from the spirit of the invention or the scope of the appended claims.

I claim:

1. In a method of making metal articles, the steps including abutting the edges of two parts of the article, passing current across the joint therebetween, continuing to pass said current until the edges are fused off or vaporized a substantial distance inwardly of their original boundary and substantially all impurities removed from the heated edges, maintaining the edges in spaced relation as they fuse back from the original boundaries, terminating the welding current, pressing the molten and purified edges together with a sufficient force to upset the molten metal and force any remaining impurities such as oxides onto a burr or fin formed by the upset metal, and, after the lapse of a predetermined time to permit slight cooling of the hot seam, further upsetting or forging it to densify and compact the metal thereadjacent while it is still hot and extrude a further burr of pure dense metal.

2. The method defined by claim 1 characterized by said fusion and vaporization and said upsetting and forging being continued until the metal at the weld attains a chemical purity greater than that of the parent metal.

3. The method defined by claim 1 characterized by removing burrs and smoothing the weld, applying an enamel coating to the article and weld, and firing it thereon whereby to produce a smooth coating over the joint uniform with that on the sections and being highly adherent to the joint.

CLARENCE J. RODMAN.